United States Patent
Micka et al.

(10) Patent No.: US 7,225,307 B2
(45) Date of Patent: May 29, 2007

(54) APPARATUS, SYSTEM, AND METHOD FOR SYNCHRONIZING AN ASYNCHRONOUS MIRROR VOLUME USING A SYNCHRONOUS MIRROR VOLUME

(75) Inventors: William Frank Micka, Tucson, AZ (US); Gail Andrea Spear, Tucson, AZ (US); Sam Clark Werner, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 336 days.

(21) Appl. No.: 10/838,767

(22) Filed: May 4, 2004

(65) Prior Publication Data

US 2005/0251633 A1    Nov. 10, 2005

(51) Int. Cl.
*G06F 12/16* (2006.01)
(52) U.S. Cl. .............................. 711/161; 711/162; 714/6
(58) Field of Classification Search ...................... None
See application file for complete search history.

(56) References Cited

U.S. PATENT DOCUMENTS

| | | | |
|---|---|---|---|
| 5,720,029 A | 2/1998 | Kern et al. | 395/182.18 |
| 6,446,175 B1 | 9/2002 | West et al. | 711/162 |
| 6,578,120 B1 | 6/2003 | Stanley et al. | 711/162 |
| 6,611,901 B1 | 8/2003 | Micka et al. | 711/162 |
| 6,671,705 B1 * | 12/2003 | Duprey et al. | 707/204 |
| 6,823,349 B1 * | 11/2004 | Taylor et al. | 707/204 |
| 2003/0028723 A1 | 2/2003 | Segev et al. | 711/113 |
| 2003/0033494 A1 | 2/2003 | Fujibayashi et al. | 711/162 |

* cited by examiner

*Primary Examiner*—T Nguyen
(74) *Attorney, Agent, or Firm*—Kunzler & McKenzie

(57) ABSTRACT

An apparatus, system and method for synchronizing an asynchronous mirror volume using a synchronous mirror volume by tracking change information when data is written to a primary volume and not yet written to an asynchronous mirror, and storing the change information on both the primary storage system and the synchronous mirror system. In the event the primary storage system becomes unavailable, the asynchronous mirror is synchronized by copying data identified by the change information stored in the synchronous mirror system and using the synchronous mirror as the copy data source.

30 Claims, 8 Drawing Sheets

APPARATUS, SYSTEM, AND METHOD FOR SYNCHRONIZING AN ASYNCHRONOUS MIRROR VOLUME USING A SYNCHRONOUS MIRROR VOLUME

BACKGROUND OF THE INVENTION

1. Field of the Invention

This invention relates to copy operations between a primary storage volume and one or more data mirror volumes. More particularly, the invention relates to maintaining data consistency between a synchronous data mirror volume and an asynchronous data mirror volume when the primary storage volume becomes unavailable.

2. Description of the Related Art

It is well known that a CPU randomly and sequentially updates one or more data storage volumes in an attached storage subsystem. It is further known that remote electronic copying of data storage volumes is a frequently used strategy for maintenance of continuously available information systems in the presence of a fault or failure of system components. Among several copy techniques, mirroring is often favored over point-in-time copying because a data mirror may be quickly substituted for an unavailable primary volume.

Conventionally, volume-to-volume mirroring from a primary volume to a data mirror volume is accomplished either synchronously or asynchronously. Synchronous mirroring can be made transparent to applications on the central processing unit (CPU) and incur substantially no CPU overhead by direct control unit to control unit copying. However, completion of a write or update is not given to the host until the write or update is completed at both the primary mirror volume and the synchronous mirror volume. In contrast, asynchronous mirroring allows the CPU access rate of the primary volume to perform independent of the mirror copying. The CPU may, however, incur copy management overhead.

In recognition for the need of multiple backup/copy approaches, several large systems offer a suite of copy functions. One such suite is offered as part of the IBM Enterprise Storage Server (ESS) package. This package includes synchronous volume-to-volume copy operations under the control of a storage controller, for example, the Peer-to-Peer Remote Copy (PPRC). It also includes asynchronous single or multi-volume copying under host control such as the Extended Remote Copy (XRC).

Referring now to FIG. 1, a prior art peer-to-peer remote copy (PPRC) system 100 is illustrated. The PPRC system 100 exemplifies a synchronous mirror system and includes a primary storage system 110 and a secondary storage system 120. A primary host 130 is connected to the primary storage system 110. The primary host 130 stores data by sending write requests to the primary storage system 110.

Data written to primary storage system 110 is copied to the secondary storage system 120, creating a mirror of the data on the primary storage system 110 on the secondary storage system 120. The copy process is a synchronous data mirroring process. In the PPRC system 100, a write made by primary host 130 is considered complete only after the data written to the primary storage system 110 is also written to the secondary storage system 120. The primary host 130 may take various forms, such as a server on a network, a Web server on the Internet, or a mainframe computer. The primary storage system 110 and secondary storage system 120 are disk systems in these examples.

A communication path 140 connects the primary host 130 to the primary storage system 110. A communication path 150 connects the primary storage system 110 with the secondary storage system 120. Communication paths 140 and 150 may comprise various links, such as fiber optic lines, packet switched communication links, enterprise systems connection (ESCON) fibers, small computer system interface (SCSI) cable, and wireless communication links.

The primary storage system 110 includes at least one storage volume 160 typically referred to as a primary volume and other well-known components such as a controller, cache, and non-volatile storage. The secondary storage system 120 includes at least one storage volume 170, typically referred to as a secondary volume. The volumes 160, 170 in the primary and secondary storage systems 110, 120 are set up in PPRC pairs. PPRC pairs are synchronous mirror sets in which a storage volume in the primary storage system 110 has a corresponding storage volume in the secondary storage system 120. For instance, primary storage volume 160 is paired with secondary storage volume 170. This pair is referred to as an established PPRC pair or synchronous mirror set, wherein the secondary storage volume 170 mirrors the data on the primary storage volume 160.

In operation, each time a write request is sent to the primary volume 160 by the primary host 130, the primary storage system 110 stores the data on the primary volume 160 and also sends the data over the communication path 150 to the secondary storage system 120. The secondary storage system 120 then copies the data to the secondary volume 170 to form a mirror of the primary volume 160. In some systems, a non-volatile cache in the primary storage system 110 and/or a non-volatile cache in the secondary storage system 120 may be temporarily used to store data directed at the primary storage volume 160 and/or the secondary storage volume 170.

Significantly, the primary storage system 110 must receive an acknowledgement that the copied data has been written to the secondary storage system 120 before terminating the I/O operation. This means that a subsequent I/O access to the same block cannot start until after the acknowledgement has been received. This acknowledgement requirement increases the response time to write requests directed to the primary storage system. In addition, as the distance between the primary storage system and the secondary storage system is increased the response time is also increased, which further decreases performance. High response times can cause unacceptable latency for completing the transaction.

The asynchronous remote copy method (XRC) is an asynchronously mirrored, volume-to-volume copy process. XRC asynchronously copies track updates on a primary volume in a primary storage system to a secondary volume in a secondary storage system. The copies are often transmitted over a long-distance communications path, possibly thousands of kilometers in length.

Referring to FIG. 2, this figure depicts a prior art XRC system 200 including a primary site 210 and a secondary site 220. The XRC system 200 exemplifies an asynchronous mirror system. The primary site 210 includes a primary host 230, for example, an IBM host running DFSMS/MVS host software. The primary host 230 further includes one or more application programs 235. A primary storage system 245 is connected to the primary host 230 by one or more channels, for example, fiber optic channels. Contained within or connected to the primary storage system 245 is at least one primary volume 250.

The secondary site 220, located for example, some thousands of kilometers remote from the primary site 210, includes a secondary host 260 having a data mover 265 operating therein. A secondary storage system 270 is connected to the secondary host 260 via one or more channels. Contained within or connected to the secondary storage system 270 is at least one secondary volume 280, typically called an asynchronous mirror volume.

The primary storage system 245 communicates with the secondary site 220 via a communication link 290. More specifically, the primary storage system 245 provides data and control information to the secondary host 260 by a communications protocol. The communication link 290 can be realized by multiple suitable communication methods, including telephone (T1, T3 lines), radio, radio/telephone, microwave, satellite, etc.

The XRC system 200 encompasses collecting data from the primary storage systems 245 so that all write requests from the primary host 230 to the primary volume 250 are preserved and applied to the secondary volume 280 without significantly impacting access rates for the primary host 230. The data and control information transmitted to the secondary site 220 must be sufficient such that a consistent copy of the primary volume 250 is established at the remote site 220.

The applications 235 generate write requests which update data on the primary storage system 245. The locations of the data updates are monitored and recorded by the primary storage system 245. In addition, an array of bits, often referred to as an active track array or changed track array, is typically used to keep a real-time record by track address on the primary volume that have been changed since the last synchronization. The changed track array is maintained in the primary storage system 245.

The updates are provided by the primary storage system 245 via the communication link 290 to the data mover 265. The data mover 265 may form the updates into a consistency group and thereafter transfer the consistency group to the secondary storage system 270, which writes the updates to the secondary volume 280. To maintain data integrity during an XRC session, the primary storage system 245 may use a second bit map, sometimes called a recovery track array or copy track array, to designate which tracks are currently being copied from the primary volume 250 to the secondary volume 280. The copy track array is maintained in the primary storage system 245.

The copy track array is typically loaded with the contents of the changed track array at the start of a synchronization operation and then the changed track array is cleared, permitting the changed track array to track the subsequent write requests to the primary volume 250. The copy track array identifying tracks that the primary storage system 245 must copy to the secondary volume 280 is cleared when acknowledgement is received that the tracks have been successfully copied to the secondary volume 280.

In the event that communication is lost during a copy session with the secondary host 260, due to any reason, the copy track array indicates which tracks must be retransmitted to retry the previous synchronization of the secondary volume 280. In some implementations, the data mover 265 inspects the updates to determine whether any records for a given time interval have been lost or are incomplete.

XRC has minimal impact on the access rate between the primary host 230 and the primary storage system 245 because a subsequent I/O operation may start directly after receiving acknowledgement that data has been written to the primary volume 250. While write requests may occur constantly according to the needs of the application programs 235, the synchronization of the secondary volume 280 is an independent, asynchronous event scheduled periodically throughout the day, typically several times per minute. Thus, an asynchronous mirror volume is only rarely identical to the primary volume 250, since writes requests to the primary volume 250 may occur during the copy operation necessary to synchronize the asynchronous mirror volume.

If the changed track array becomes unavailable for any reason, the data mover 265 cannot determine the location of tracks changed since the last synchronization in order to copy the tracks to the secondary volume 280. Additionally, if the copy track array becomes unavailable during a synchronization, the data mover cannot determine the locations of tracks relating to the interrupted synchronization that remain to be copied to the secondary volume 280. Consequently, to ensure consistency, the XRC system 200 typically performs a time consuming process of copying the entire contents of the primary volumes to the associated secondary volumes to reconstruct the asynchronous mirror.

In some systems, both synchronous and asynchronous data mirrors are maintained. This configuration permits rapid promotion of a synchronous mirror system to become a replacement primary storage system in the event that the original primary storage system becomes unavailable. The configuration also provides for the maintenance of a nearly real-time remote copy of the primary storage system data for use if the primary site becomes unavailable. In this configuration, the storage volumes on the primary storage system may act as the primary volumes for both local synchronous mirror volumes and remote asynchronous mirror volumes.

However, if the primary storage system incurs a fault or becomes otherwise unavailable, the changed track array and the copy track array stored in the primary storage system become unavailable. Without access to this information, synchronization of the asynchronous mirror may require copying the contents of the complete set of primary volumes or the synchronous secondary volumes to the associated asynchronous mirror volumes. In a large installation, this synchronization may involve hundred of volumes and may require hours or days of recovery time. Since the asynchronous mirror cannot offer protection until the synchronization is complete, the system data will be unprotected against a disaster at the primary site during the recovery period.

A need exists for a method, apparatus, and system to synchronize an asynchronous mirror volume using a synchronous mirror volume. Beneficially, such a method, apparatus, and system would decrease recovery time from a primary storage system going offline and provide a means for a continuous remote copy of system data to be maintained for use in the event the primary site becomes unavailable.

SUMMARY OF THE INVENTION

The present invention has been developed in response to the present state of the art, and in particular, in response to the problems and needs in the art that have not yet been fully solved by currently available asynchronous mirror synchronizers. Accordingly, the present invention has been developed to provide a method, apparatus, and system for synchronizing an asynchronous mirror volume using a synchronous mirror volume that overcomes many or all of the above-discussed shortcomings in the art.

The apparatus for synchronizing an asynchronous mirror volume using a synchronous mirror volume is provided with a logic unit containing a plurality of modules configured to functionally execute the necessary steps of synchronizing the asynchronous mirror volume. These modules in the described embodiments include a monitor module, a storage module, and a synchronization module.

The apparatus, in one embodiment, includes a monitor module that tracks write change information based on write requests received by a primary volume where the primary volume is mirrored by a synchronous mirror volume and an asynchronous mirror volume, a storage module that stores the write change information in a location remote from the primary volume, and a synchronization module that synchronizes the asynchronous mirror volume using the synchronous mirror volume as the copy data source, using the write change information stored in the remote location to determine the data to copy to the asynchronous mirror volume.

A system of the present invention is also presented for synchronizing an asynchronous mirror volume using a synchronous mirror volume. The system may be embodied with a primary host, a primary storage system, a second storage system functioning to provide a synchronous data mirror, and a third storage system functioning to provide an asynchronous data mirror. The location of data written to the primary storage system and not yet written to the asynchronous data mirror is tracked and saved to the primary and second storage system. If the primary storage system becomes unavailable, the second storage system is promoted to become the new primary storage system, and the asynchronous data mirror is synchronized using the second storage system as the copy data source and using the tracking information stored in the second storage system to determine the location for data to copy to the asynchronous data mirror.

A method of the present invention is also presented for synchronizing an asynchronous mirror volume using a synchronous mirror volume. The method in the disclosed embodiments substantially includes the steps necessary to carry out the functions presented above with respect to the operation of the described apparatus and system. In one embodiment, the process includes tracking change information written to a primary volume but not yet written to an asynchronous data mirror and storing the write change information to a primary storage system and a synchronous mirror system. Additionally, the method includes synchronizing the asynchronous mirror system by using the write change information stored in the synchronous mirror system to locate data to copy and by using the synchronous mirror system as the copy data source in the event the primary storage system becomes unavailable.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
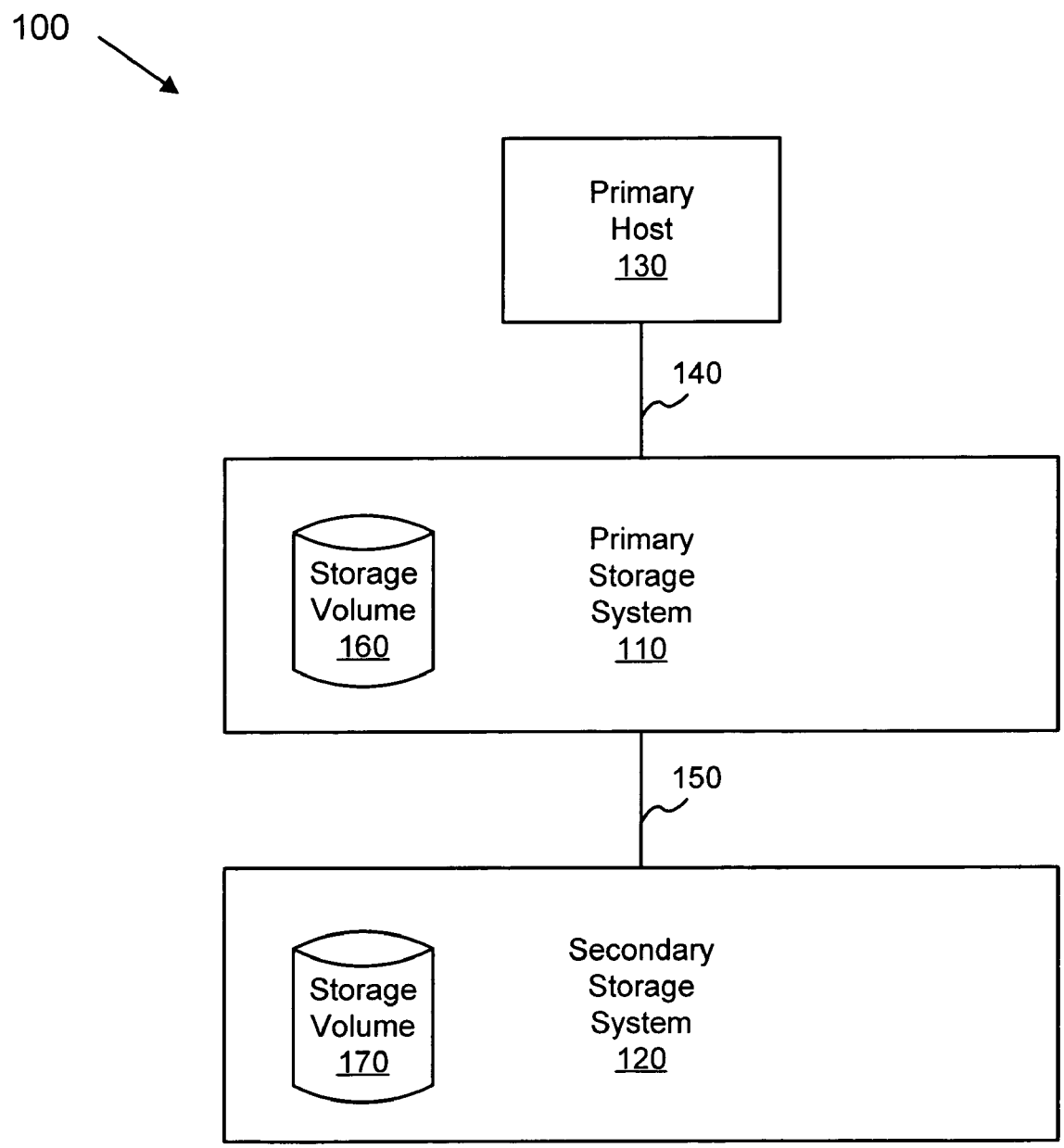
FIG. 1 is a schematic block diagram illustrating a prior art peer-to-peer remote copy (PPRC) system.
Figure 2:
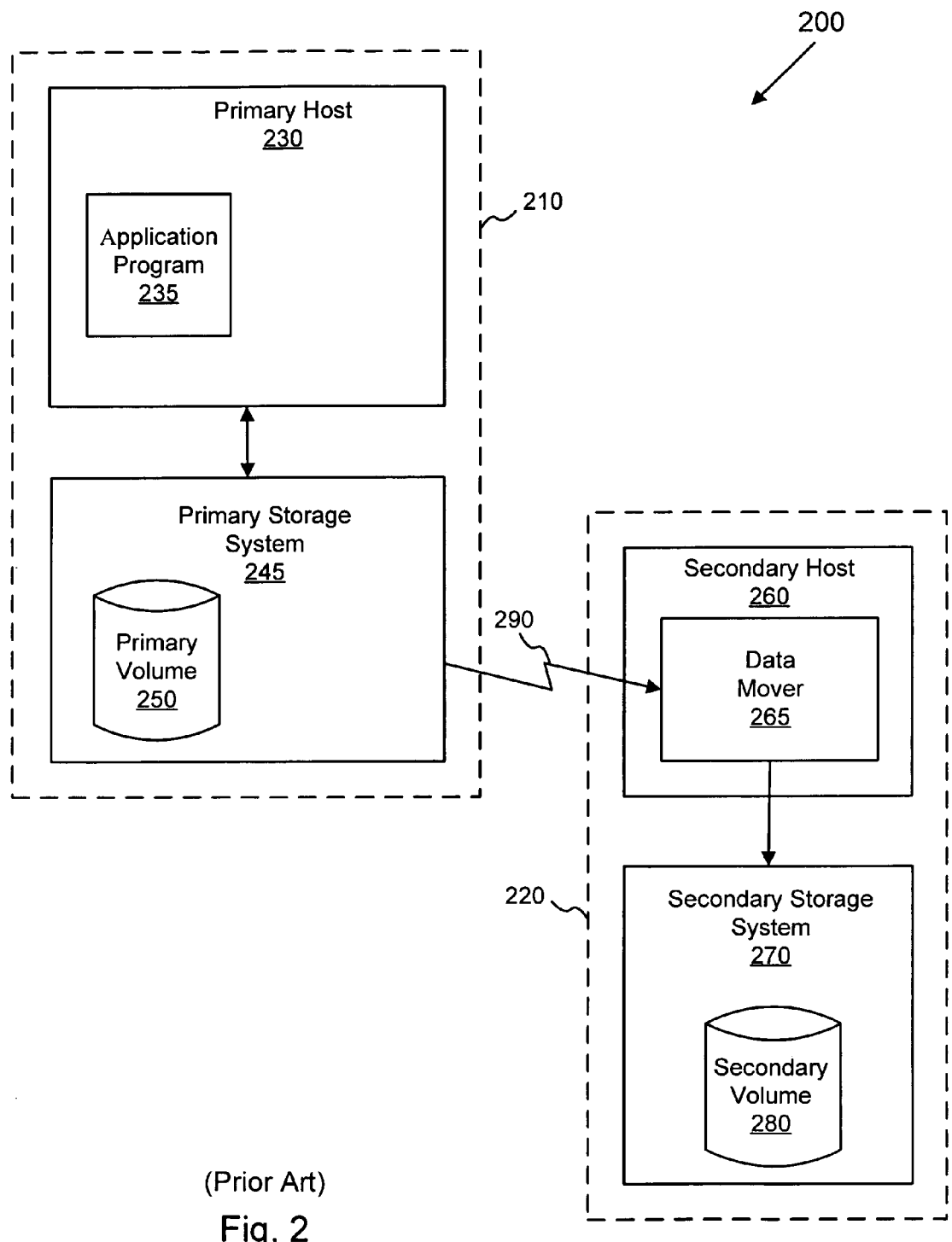
FIG. 2 is a schematic block diagram illustrating a prior art external remote copy (XRC) system.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

The present invention sets forth an apparatus, system and method to synchronize an asynchronous mirror volume using a synchronous mirror volume. The invention may be embodied in a system with a primary storage system and employing a local synchronous data mirror system and a remote asynchronous data mirror system. Upon failure of the primary storage system, the synchronous data mirror system may replace the primary storage system and the asynchronous data mirror system may be synchronized using data contained in the synchronous data mirror system without copying the entire primary volume.

Figure 3:
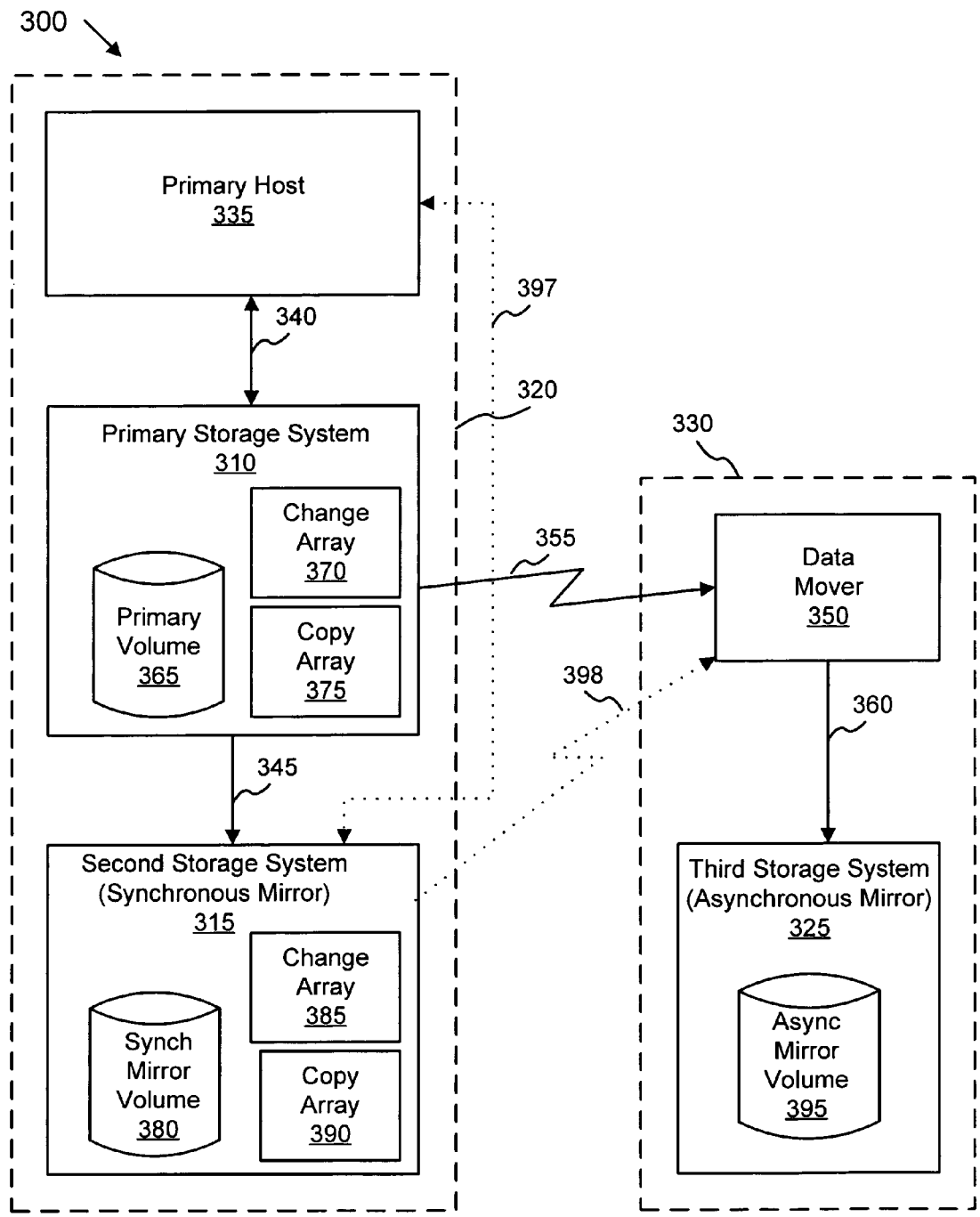
FIG. 3 is a schematic block diagram illustrating one embodiment of a multiple data mirror system in accordance with the present invention.

FIG. 3 depicts a schematic block diagram illustrating one embodiment of a multiple mirror system 300 in accordance with the present invention. The multiple mirror system 300 includes a primary storage system 310, a second storage system 315 functioning as a synchronous mirror located at or near a primary site 320, and an third storage system 325 functioning as an asynchronous mirror located at a remote site 330. The multiple mirror system 300 further includes a primary host 335 in communication with the primary storage system 310. The primary host 335 stores data in the primary storage system 310.

Data written to the primary storage system 310 is synchronously copied to the second storage system 315, creating a synchronous mirror of the data on the primary storage system 310 within the second storage system 315. A write request made by primary host 335 is considered complete only after the data written to the primary storage system 310 is written to the second storage system 315 and a data structure called the change array 370 is updated to track the location of the data that the write request changed. The second data structure called the copy array 375 is used to copy the data to the third storage system 325.

A primary communication path 340 connects the primary host 335 to the primary storage system 310. A communication path 345 connects the primary storage system 310 with the second storage system 315. The primary storage system 310 communicates with a data mover 350 associated with the third storage system 325 via a remote communication link 355. A communication path 360 connects the data mover 360 to the third storage system 325. The communication paths 340, 345, 360 may comprise various links, such as a fiber optic line, a packet switched communication link, an enterprise systems connection (ESCON) fiber, a small computer system interface (SCSI) cable, or a wireless communication link.

The primary storage system 310 includes at least one primary volume 365, a changed track array 370 and a copy track array 375, and may include well known components such as a cache memory (not shown) and/or a non-volatile memory (not shown). The second storage system 315 includes at least one synchronous mirror volume 380, a changed track array 385 and a copy track array 390, and may also include a cache memory and/or a non-volatile memory. The second storage 315 acts as a remote location to store the changed track array 385 and the copy track array 390, such that if the primary storage system 310 became unavailable, the arrays 385 and 390 would still be available. Other remote locations such as the primary host 335 may be used to store the arrays 385 and 390. The third storage system 325 includes at least one asynchronous mirror volume 395, and may also include a cache memory and/or a non-volatile memory.

In operation, each time data is written to the primary volume 365 by the primary host 335 through a write request, the primary storage system 310 sends the data over the communication path 345 to the secondary storage system 315. The secondary storage system 315 copies the data to the synchronous mirror volume 380 to form a mirror of the primary volume 365. Simultaneously, the primary storage system 310 updates the changed track array 370 in the primary storage system 310 and the changed track array 385 in the second storage system 315 to indicate the location of data written to the primary volume 365 and synchronous mirror volume 380 since the asynchronous mirror volume 395 was last synchronized.

Normally, the asynchronous mirror volume 295 is synchronized periodically by copying data identified by the changed track array 370 from the primary volume 365 to the asynchronous mirror volume 395. To start the synchronization, the changed track array 370 may be copied to the copy track array 375, indicating that the tracks identified in the copy track array 375 are in route to the asynchronous mirror volume 395. Subsequently the changed track array 370 may be cleared, indicating that no write requests had been received since the synchronization started.

Simultaneously, the data mover 350 uses the copy track array 375 to identify data on the primary volume 365 to copy to the asynchronous mirror volume 395. As each track is successfully copied to the asynchronous mirror volume 395, the copy track array 375 element corresponding to the track is cleared. In some embodiments, the copy track array 375 is not cleared until after all tracks are successfully transferred to the asynchronous mirror volume 395. The changed track array 385 and the copy track array 390 located in the second storage system 315 are updated concurrently with the associated changed track array 370 and the copy track array 375 on the primary storage system 310 to form a mirror set of arrays.

If the primary storage system 310 becomes unavailable due to component fault, communications failure or system maintenance, the synchronous mirror relationship between the primary storage system 310 and the second storage system 315 is terminated. The second storage system 315 is promoted to become a replacement primary storage system by activating a primary communication path 397 to the primary host 335. All write requests are presented to the second storage system 315, and the synchronous mirror volume 380 becomes the primary volume to the asynchronous mirror volume 395. Since the synchronous mirror volume 380 is an exact copy of the former primary volume 365, the multiple mirror system 300 may continue to function normally by using data on the synchronous mirror volume 380.

If the primary storage system 310 is unavailable, the changed track array 370 and the copy track array 375 may be likewise unavailable. In order to continue to maintain the asynchronous mirror of the system data, the second storage system 315 acts as the source of information for synchronizing the asynchronous mirror. A remote communication link 398 is activated between the second storage system 315 and the data mover 350 associated with the third storage system 325.

To start the synchronization of the asynchronous mirror volume 395 using the synchronous mirror volume 380, the changed track array 385 may be merged into the copy track array 390, indicating that the tracks identified in the changed track array 385 and any tracks not acknowledged as written to the asynchronous mirror volume 395 are in route to the asynchronous mirror volume 395. Subsequently the changed track array 385 may be cleared, indicating that no write requests had been received since the synchronization started.

Simultaneously, the data mover 350 uses the copy track array 390 to identify data on the synchronous mirror volume 380 to copy to the asynchronous mirror volume 395. As each track is successfully copied to the asynchronous mirror volume 395, the copy track array 390 element corresponding to the track is cleared. In some embodiments, the copy track array 390 elements are not cleared until after all tracks are successfully transferred to the asynchronous mirror volume 395. When all of the data has been copied, the asynchronous mirror volume 395 contains an updated mirror of the newly promoted primary volume 380.

Figure 4:
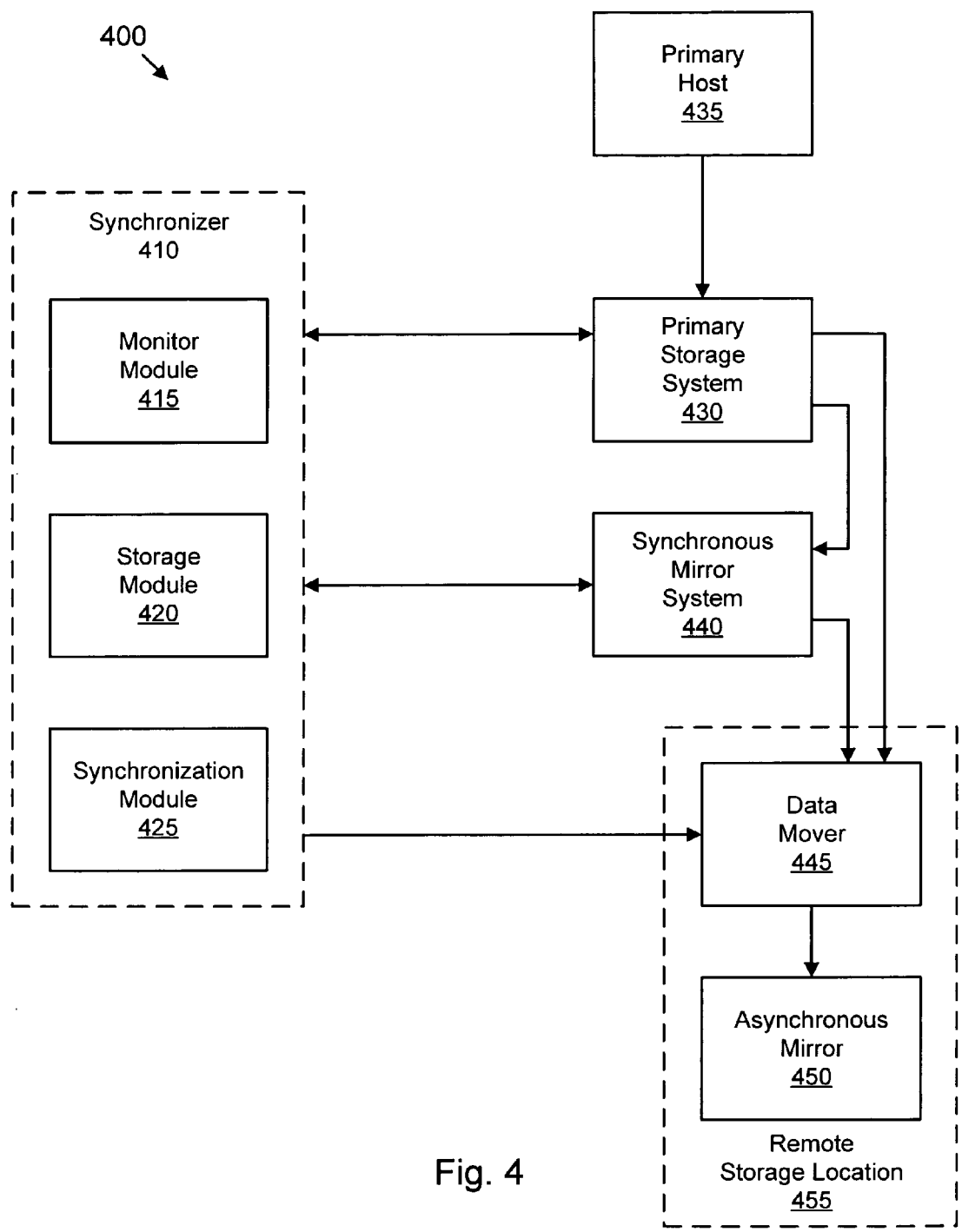
FIG. 4 is a schematic block diagram illustrating one embodiment of a synchronizer in accordance with the present invention.

FIG. 4 is a schematic block diagram illustrating one embodiment of an apparatus 400 in accordance with the present invention. The synchronizer 410 includes a monitor module 415, a storage module 420 and a synchronization module 425. The synchronizer 410 communicates with a primary storage system 430 that receives read and write requests from a primary host 435, a synchronous mirror system 440, and a data mover 445 associated with an asynchronous mirror 450. The data mover 445 and asynchronous mirror 450 are located at a remote storage location 455.

The monitor module 415 tracks write change information associated with write requests from the primary host 435 to the primary storage system 430 by recording the location of data extents written to primary volumes located in the primary storage system 430. In some embodiments, a data extent is a track on a data storage device. In other embodiments, a data extent is defined as an addressable location with an associated quantity of data. The location information is used to identify the data extents at the time the asynchronous mirror 450 is synchronized. The monitor module 415 also tracks data extents that are in the process of being copied from the primary storage system 430 to the asynchronous mirror 450. Tracking a copy in progress permits a retry of the copy if a failure occurs in a system component or with the communication path.

The storage module 420 stores the write change information from the monitor module 415 in both the primary storage system 430 and the synchronous mirror system 440. In normal operation, the tracking information stored in the primary storage system 430 is used to update the asynchronous mirror 450. If the primary storage system 430 becomes unavailable, the tracking information stored in the primary storage system 430 is also unavailable. In this case, tracking information stored in the synchronous mirror system 440 may be used to synchronize the asynchronous mirror 450.

The synchronization module 425 synchronizes the asynchronous mirror 450 with the synchronous mirror system 440 in the event that the primary storage system 430 becomes unavailable. The synchronization module 425 synchronizes the asynchronous mirror 450 by copying data from the synchronous mirror system 440 to the asynchronous mirror 450 using tracking information stored in the synchronous mirror system 440 to identify the location of data to copy.

Figure 5:
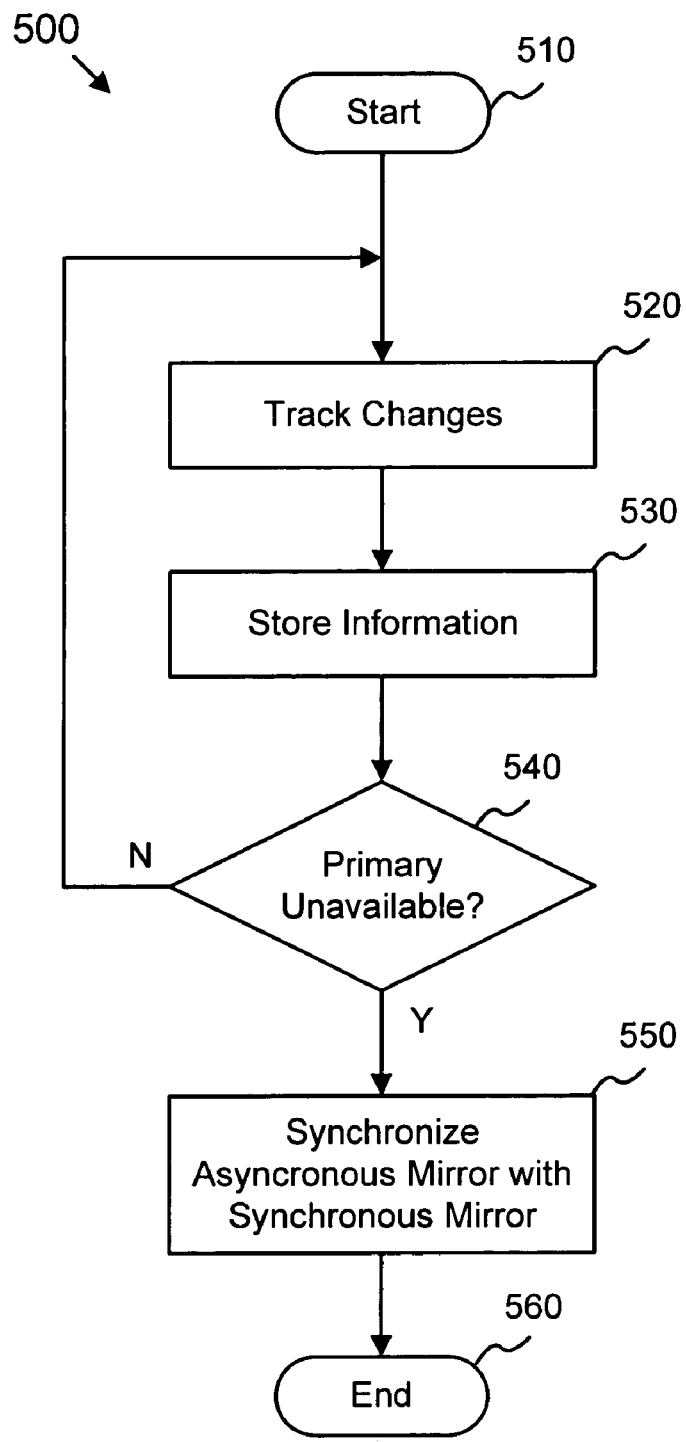
FIG. 5 is a schematic flow chart diagram illustrating one embodiment of a method for synchronizing an asynchronous mirror volume using a synchronous mirror volume in accordance with the present invention.

FIG. 5 is a schematic flow chart diagram illustrating one embodiment of a method for synchronizing an asynchronous mirror volume using a synchronous mirror volume. The method 500 starts when the system is configured to use a primary storage system 310 (See FIG. 3), a second storage system 315 functioning as a synchronous mirror, and a third storage system 325 functioning as an asynchronous mirror.

The monitor module 415 tracks 520 the locations of write requests to a primary volume 365 for use in subsequent updating of an asynchronous mirror volume 395, and tracks 520 copy operations as data is copied from the primary volume 365 to the asynchronous mirror volume 395. The storage module 420 then stores 530 the tracking information in the second storage system 315 that functions as the synchronous mirror.

If the method 500 determines 540 that the primary storage system 310 is available, the method continues to track 520 and store 530 write change information relating to primary volume changes that are not yet reflected in the asynchronous mirror volume 395. If the method 500 determines 540 that the primary storage system 310 is unavailable, the synchronization module 425 synchronizes 550 the asynchronous mirror volume 395 with the synchronous mirror volume 380. The synchronization module 425 uses the synchronous mirror volume 380 as the copy data source. The write change information stored in the synchronous mirror system 315 is used to identify the data to copy to the asynchronous mirror volume 395.

Figure 6:
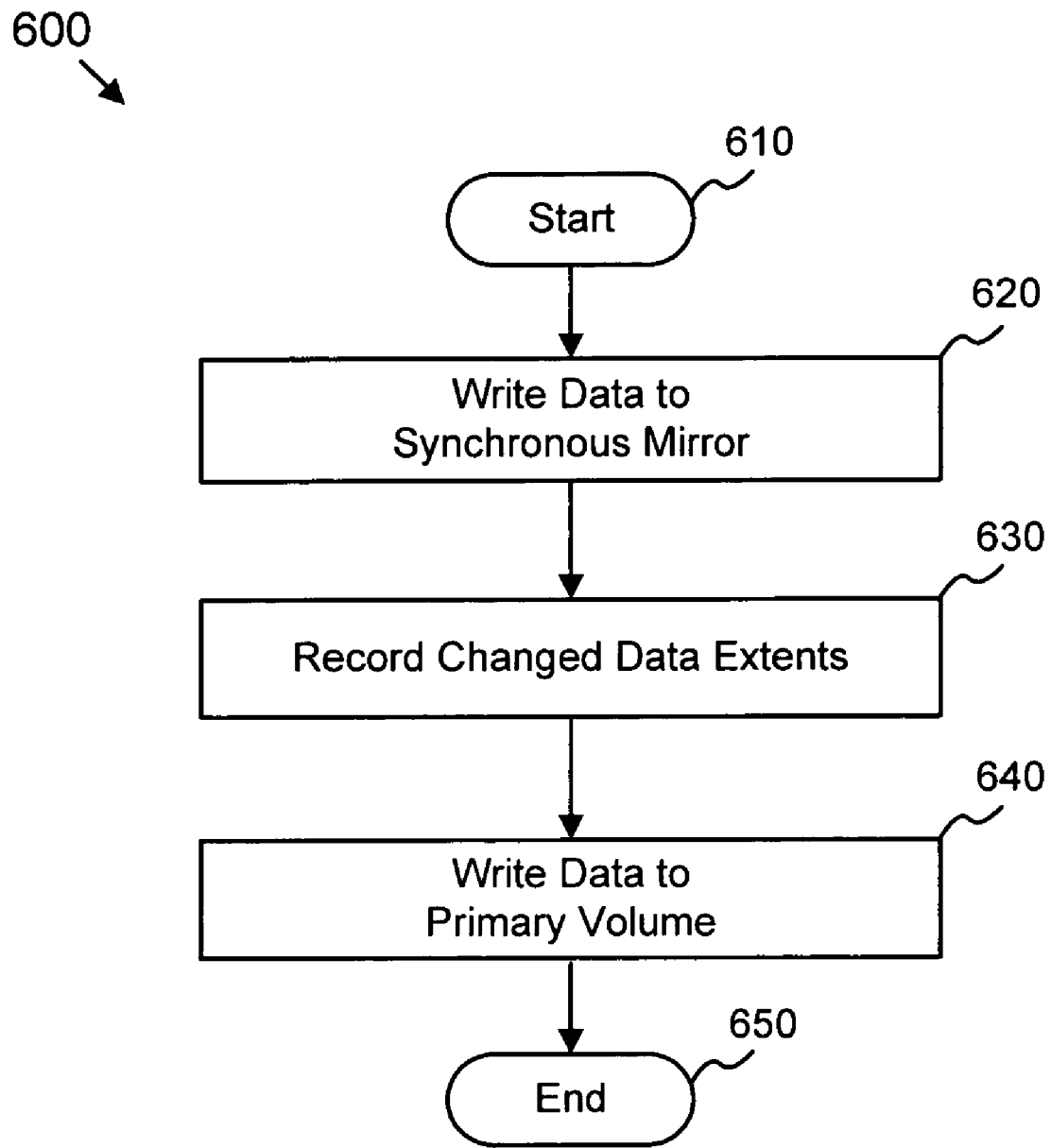
FIG. 6 is a schematic block diagram illustrating one embodiment of a method for recording write change information in accordance with the present invention.

FIG. 6 is a schematic block diagram illustrating one embodiment of a method for recording write change information in accordance with the present invention. The update write change information method 600 starts 610 when a write to the primary volume 365 (See FIG. 3) is requested. The method 600 writes 620 data to the synchronous mirror volume 380 and then records 630 the location of successfully written data extents in the changed track array 370 of the primary storage system 310 and the changed track array 385 of the synchronous mirror system 315. Subsequently, the method 600 writes 640 the data extents to the primary volume 365 and ends 650.

If a fault occurs in the writing of the data to the synchronous mirror system 315 a write fault status will be returned to the primary host 230, the primary storage volume 250 will not be written, and the changed track array 270 will not be updated. If the write failure to the synchronous mirror volume 380 is permanent, then synchronous mirroring operations are suspended.

Figure 7:
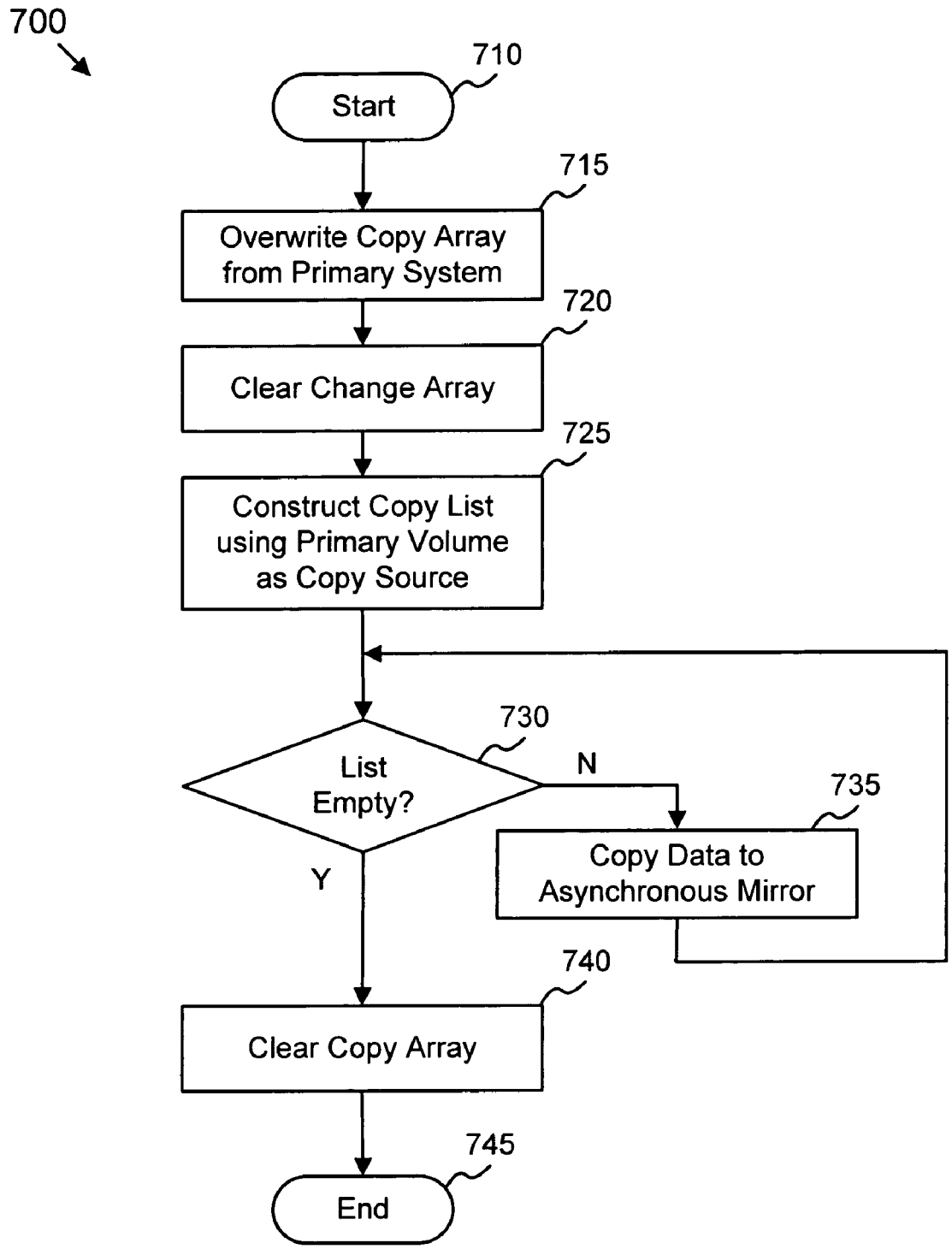
FIG. 7 is a schematic block diagram illustrating one embodiment of a method for synchronizing an asynchronous mirror with a primary volume.

FIG. 7 is a schematic block diagram illustrating one embodiment of a method for synchronizing an asynchronous mirror with a primary volume. The method 700 starts 710 when a periodic synchronization of the asynchronous mirror begins. The synchronization module 425 overwrites 715 the copy track arrays 375, 390 with data from the changed track arrays 370, 385.

Then, the synchronization module 425 clears 720 the changed track arrays 370, 385, preparing the changed track arrays 370 and 385 to track the locations of subsequent write requests to the primary volume 365. In one embodiment, the changed track arrays 370, 385 and the copy track arrays 375, 390 are toggled, such that the former copy track arrays 375,390 are used to track locations of write requests to the primary volume 365, and the former changed track arrays 370,385 are used as the source to track data as it is copied from the primary volume 365 to the asynchronous mirror volume 395.

Subsequently, the synchronization module 425 constructs 725 a copy list using location information from the recently loaded copy track array 375, the list containing data extents to copy from the primary volume 365. Note, that copy track array 375 of the primary storage system 310 is preferably used. Alternatively, the copy track array 390 of the second storage system 315 could be used regardless of availability of the primary storage system 310. Then, the synchronization module 425 determines 730 if all copy list data extents have been successfully copied. If the copy list contains more items, the synchronization module 425 copies 735 the next data extent from the primary volume 365 to a corresponding location on the asynchronous mirror volume 395. If the copy list is empty 730, the synchronization module 425 clears 740 the copy track arrays 375,390 to indicate that all data was successfully copied to the asynchronous mirror volume 395 and ends 745.

Figure 8:
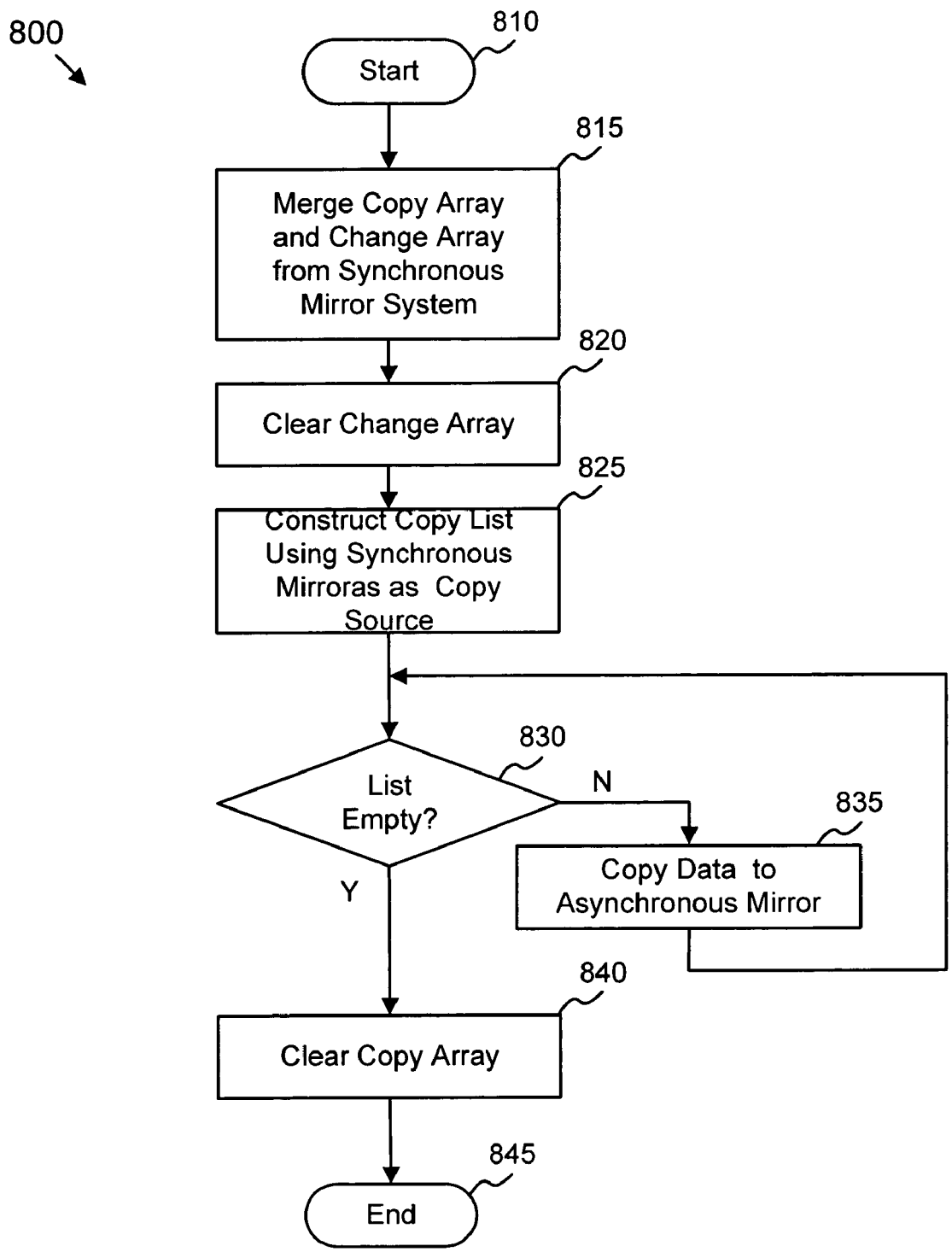
FIG. 8 is a schematic block diagram illustrating one embodiment of a method for synchronizing an asynchronous mirror with a synchronous mirror in accordance with the present invention.

FIG. 8 is a schematic block diagram illustrating one embodiment of a method for synchronizing an asynchronous mirror with a synchronous mirror in accordance with the present invention. The method 800 starts 810 at the time a primary storage system similar to the primary storage system 310 of FIG. 3 becomes unavailable. The second storage system 315 may be quickly promoted to function as a primary storage system 310, 315 by establishing direct connection paths to the primary host 335. The synchronous mirror volume 380 may be promoted to become a primary volume 380, 365. The promotion may be done manually by system configuration changes or automatically by monitoring software.

The synchronization module 425 merges 815 the changed track array 385 into the copy track array 390 to create an array referencing data extents that were in the copy process when the primary storage system 310 became unavailable, combined with data extents that were changed since the latest synchronization of the asynchronous mirror system 325 before the primary storage system 310 became unavailable. Then, the synchronization module 425 clears 820 the changed track array 385, preparing the changed track array 385 to record the location of subsequent writes to the newly promoted primary volume 380, 365.

Subsequently, the synchronization module 425 constructs 825 a copy list using information from the recently loaded copy track array 390, the list containing data extents that need to be copied from the new primary volume 380, 365 to synchronize the asynchronous mirror volume 395. Then, the synchronization module 425 determines 830 if all copy list data extents have been copied. If the copy list contains more items, the method 800 copies 835 the next data extent from the new primary volume 380, 365 to the associated location in the asynchronous mirror volume 395. If the copy list is empty, the method 800 clears 840 the copy track array 390 to indicate that all data was successfully copied to the asynchronous mirror volume 395 and ends 845.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for synchronizing an asynchronous mirror volume using a synchronous mirror volume, the apparatus comprising:
   a monitor module configured to track write change information for asynchronous mirroring based on write requests received by a primary volume, the primary volume mirrored by a synchronous mirror volume and an asynchronous mirror volume;
   a storage module configured to store the write change information on a location remote from the primary volume; and
   a synchronization module configured to synchronize the asynchronous mirror volume with the synchronous mirror volume using the write change information on the remote location in response to the primary volume becoming unavailable.

2. The apparatus of claim 1, wherein the write change information comprises:
   a first data structure configured to record locations of data extents on the primary volume changed by the write requests; and
   a second data structure configured to record locations of changed data extents on the primary volume during a synchronization that have yet to be acknowledged as stored on the asynchronous mirror volume.

3. The apparatus of claim 2, wherein synchronizing the asynchronous mirror volume comprises copying data identified in the first data structure and data identified in the second data structure from the synchronous mirror volume to the asynchronous mirror volume.

4. The apparatus of claim 2, wherein the data extent is a track of a data storage device.

5. The apparatus of claim 2, wherein each of the first data structure and second data structure comprise a track bitmap array.

6. A system for synchronizing an asynchronous mirror volume using a synchronous mirror volume, the system comprising:
   a primary host configured to read and write data;
   a primary storage system in communication with the primary host, the primary storage system having a primary volume;
   a second storage system configured to synchronously mirror data on the primary storage system using a synchronous mirror volume;
   a third storage system configured to asynchronously mirror data on the primary storage system by way of a data mover and an asynchronous mirror volume;

a monitor module configured to track write change information for asynchronous mirroring on the primary storage system based on write requests received by the primary storage system;

a storage module configured to store the same write change information on the second storage system; and a synchronization module configured to synchronize the third storage system with the second storage system using the write change information on the second storage system in response to the primary storage system becoming unavailable.

7. The system of claim 6, wherein the write change information comprises:

a first data structure configured to record locations of data extents of the primary volume changed by the write requests; and a second data structure configured to record locations of changed data extents of the primary volume during a synchronization that have yet to be acknowledged as stored on the asynchronous mirror volume.

8. The system of claim 7, wherein synchronizing the third storage system with the second storage system comprises copying data identified in the first data structure and data identified in the second data structure from the synchronous mirror volume to the asynchronous mirror volume.

9. A computer readable storage medium comprising computer readable code configured to carry out a method for synchronizing an asynchronous mirror volume using a synchronous mirror volume, the method comprising:

tracking write change information for asynchronous mirroring based on write requests received by a primary volume, the primary volume mirrored by a synchronous mirror volume and an asynchronous mirror volume;

storing the write change information in a location remote from the primary volume; and synchronizing the asynchronous mirror volume with the synchronous mirror volume using the write change information from the remote location in response to the primary volume becoming unavailable.

10. The computer readable storage medium of claim 9, further comprising converting the synchronous mirror volume to a new primary volume and mirroring the new primary volume using the asynchronous mirror volume.

11. The computer readable storage medium of claim 9, wherein synchronizing the asynchronous mirror volume is performed without operator intervention.

12. The computer readable storage medium of claim 9, wherein the write change information comprises:

a first data structure configured to record locations of data extents of the primary volume changed by the write requests; and a second data structure configured to record locations of changed data extents of the primary volume during a synchronization that have yet to be acknowledged as stored on the asynchronous mirror volume.

13. The computer readable storage medium of claim 12, wherein synchronizing the asynchronous mirror volume comprises copying data identified in the first data structure and data identified in the second data structure from the synchronous mirror volume to the asynchronous mirror volume.

14. The computer readable storage medium of claim 12, further comprising storing and updating the first data structure and second data structure at both the primary volume and the remote location.

15. The computer readable storage medium of claim 12, wherein each of the first data structure and second data structure comprises a track bitmap array.

16. A method for synchronizing an asynchronous mirror volume using a synchronous mirror volume, the method comprising:

tracking write change information for asynchronous mirroring based on write requests received by a primary volume, the primary volume mirrored by a synchronous mirror volume and an asynchronous mirror volume;

storing the write change information on a location remote from the primary volume; and synchronizing the asynchronous mirror volume with the synchronous mirror volume using the write change information from the remote location in response to the primary volume becoming unavailable.

17. The method of claim 16, further comprising converting the synchronous mirror volume to a new primary volume and mirroring the new primary volume using the asynchronous mirror volume.

18. The method of claim 16, wherein synchronizing the asynchronous mirror volume is performed without operator intervention.

19. The method of claim 16, wherein the write change information comprises:

a first data structure configured to record locations of data extents of the primary volume changed by the write requests; and a second data structure configured to record locations of changed data extents of the primary volume during a synchronization that have yet to be acknowledged as stored on the asynchronous mirror volume.

20. The method of claim 19, wherein synchronizing the asynchronous mirror volume comprises copying data identified in the first data structure and data identified in the second data structure from the synchronous mirror volume to the asynchronous mirror volume.

21. The method of claim 19, further comprising storing and updating the first data structure and second data structure at both the primary volume and the remote location.

22. The method of claim 19, wherein each of the first data structure and second data structure comprise a track bitmap array.

23. An apparatus for synchronizing an asynchronous mirror volume using a synchronous mirror volume, the apparatus comprising:

means for tracking write change information for asynchronous mirroring based on write requests received by a primary volume, the primary volume mirrored by a synchronous mirror volume and an asynchronous mirror volume;

means for storing the write change information on a location remote from the primary volume; and means for synchronizing the asynchronous mirror volume with the synchronous mirror volume using the write change information from the remote location in response to the primary volume becoming unavailable.

24. The apparatus of claim 23, wherein the write change information comprises:

a first data structure configured to record locations of data extents of the primary volume changed by the write requests; and a second data structure configured to record locations of changed data extents of the primary volume during a synchronization that have yet to be acknowledged as stored on the asynchronous mirror volume.

25. The apparatus of claim 24, wherein synchronizing the asynchronous mirror volume comprises copying data identified in the first data structure and data identified in the second data structure from the synchronous mirror volume to the asynchronous mirror volume.

26. The apparatus of claim 24, wherein the data extent is a track of a data storage device.

27. The apparatus of claim 24, wherein each of the first data structure and second data structure comprise a track bitmap array.

28. An apparatus for synchronizing an Extended Remote Copy (XRC) secondary volume with a Peer-to-Peer Remote Copy (PPRC) secondary volume in response to a primary volume becoming unavailable, the apparatus comprising:
   a monitor module configured to track write change information for asynchronous mirroring based on write requests received by a primary volume, the primary volume mirrored by a PPRC secondary volume and an XRC secondary volume;
   a storage module configured to store the write change information on a location remote from the primary volume; and
   a synchronization module configured to synchronize the XRC secondary volume with the PPRC secondary volume using the write change information on the remote location in response to the primary volume becoming unavailable.

29. The apparatus of claim 28, wherein the write change information comprises:
   a changed track away comprising away elements corresponding to tracks of the primary volume, the array elements configured to denote a track of the primary volume that differs from a corresponding track of the XRC secondary volume; and
   a copy track away comprising away elements corresponding to tracks of the primary volume, the away elements configured to denote a track of data from the primary volume sent to the XRC secondary volume but not acknowledged as recorded on the XRC secondary volume.

30. The apparatus of claim 28, wherein synchronizing the XRC secondary volume comprises copying each track of the PPRC secondary volume identified by an array element in the active track array and each track identified by an away element in the recovery track away from the PPRC secondary volume to the XRC secondary volume.

* * * * *